US012745759B2

(12) United States Patent
Li et al.

(10) Patent No.: US 12,745,759 B2
(45) Date of Patent: Sep. 29, 2026

(54) POULTRY BODY SIZE DATA ACQUISITION SYSTEM

(71) Applicants: Shandong Agricultural University, Taian City (CN); Shandong Center for Quality Control of Feed and Veterinary Drug, Jinan City (CN); Shandong Hemeihua Nongmu Co., Ltd, Jinan City (CN)

(72) Inventors: Xianyao Li, Tai'an City (CN); Liangyu Chen, Tai'an City (CN); Meng Liang, Jinan City (CN); Yanan Zhao, Jinan City (CN); Jiming Liu, Jinan City (CN); Yuanmei Wang, Tai'an City (CN); Baishun Ma, Jinan City (CN); Liying Liu, Tai'an City (CN); Youzhi Li, Jinan City (CN)

( * ) Notice: Subject to any disclaimer, the term of this patent is extended or adjusted under 35 U.S.C. 154(b) by 331 days.

(21) Appl. No.: 18/616,170

(22) Filed: Mar. 26, 2024

(65) Prior Publication Data

US 2024/0381853 A1 Nov. 21, 2024

(30) Foreign Application Priority Data

May 19, 2023 (CN) ......................... 202310566248.3

(51) Int. Cl.
*A01K 45/00* (2006.01)
*G01S 17/88* (2006.01)

(52) U.S. Cl.
CPC .............. *A01K 45/00* (2013.01); *G01S 17/88* (2013.01)

(58) Field of Classification Search
CPC ........ A01K 45/00; Y02A 40/70; G01G 19/50; G01G 21/22; G01S 17/88; G01B 11/24
USPC ............................................................ 452/54
See application file for complete search history.

(56) References Cited

U.S. PATENT DOCUMENTS

| | | | | |
|---|---|---|---|---|
| 7,623,249 B2 * | 11/2009 | Sandberg | G01B 11/245 | 250/559.22 |
| 2008/0200107 A1 * | 8/2008 | Christensen | A22B 5/007 | 452/157 |
| 2009/0013719 A1 * | 1/2009 | Loving | A44C 15/003 | 63/3 |
| 2010/0105306 A1 * | 4/2010 | Daley | A22C 17/0073 | 362/249.02 |
| 2023/0180770 A1 * | 6/2023 | Ursella | G01N 23/083 | 452/149 |

* cited by examiner

*Primary Examiner* — Richard T Price, Jr.

(57) ABSTRACT

The invention introduces a system for acquiring data on poultry body size, utilizing a baseplate for immobilization. After positioning the poultry, the system adjusts a fixing device on a rod to secure the poultry's knee joints using a fixing clip, thereby stabilizing the poultry's body. A 3D laser scanning lens then conducts comprehensive 3D scanning of the poultry's entire body, transmitting the data to a 3D microcomputer which generates an optimal dynamic model image. This microcomputer organizes and analyzes data from the model using a computer algorithm, ultimately displaying the poultry's body size indices on the 3D microcomputer's display. This method circumvents inaccuracies common with traditional tools like electronic scales, enhancing the speed and precision of poultry body composition data collection.

9 Claims, 4 Drawing Sheets

POULTRY BODY SIZE DATA ACQUISITION SYSTEM

TECHNICAL FIELD

The invention relates to the field of poultry detection technology, in particular to a poultry body size data acquisition system.

BACKGROUND ART

The weight and body size of poultry often directly or indirectly affect the production performance. As a phenotypic trait, indirect or early selection of some limited traits or late-maturing traits by using the correlation between traits has become an important methods of breeding technology.

At present, in order to study the growth and development of poultry and the physical characteristics of the varieties, in addition to observing the appearance of poultry, measurement tools are also used to measure the weight, body size, and slaughter performance of poultry, so as to analyze the growth and slaughter performance of poultry, and accumulate basic data for the conservation, breeding, development, and utilization of poultry.

In the existing technology, in order to make a more comprehensive analysis of the body size indicators of poultry, measurement tools such as tape, caliper, meter ruler, cotton thread, chest angler, and electronic scale are usually used, and the measurement indicators are comprehensive. Although there are many measurement tools and comprehensive measurement indicators, many drawbacks exist in the whole measurement process, especially the use of human labor and the inaccuracy of various indicator data. The inaccuracy of each index data makes it contains many limitations in the breeding management of the poultry breeding industry and its application in the field of scientific and technological research. The way of quickly and accurately solving the various drawbacks of poultry body size measurement is a very important focus and technical point in the field of poultry research in the future.

SUMMARY OF THE INVENTION

In order to solve the above technical problems, the invention proposes a poultry body size data acquisition system, which includes a fixing device and a 3D scanning device, where the fixing device includes an immobilization baseplate, an electrode plate, and fixing rods which is flexibly arranged on relative sides of the immobilization baseplate, and the electrode plate is located between two fixing rods, a fixing device is flexibly arranged on each fixing rod, and a fixing clip is arranged at an end of the fixing device; a weight sensor is arranged inside the immobilization baseplate, and the weight sensor is located in a middle of the electrode plate; the 3D scanning device includes a 3D microcomputer and an adjustable soft rod set on the 3D microcomputer; the adjustable soft rod is equipped with a 3D laser scanning lens through a regulated multiplexer; the 3D laser scanning lens scans the poultry fixed on the immobilization baseplate.

Preferably, a connection point between the fixing rod and the immobilization baseplate is taken as a rotation point, and the fixing rod rotates around the immobilization baseplate in a range of 0-180°.

Preferably, when the fixing rod is upright, the angle between the fixing rod and the electrode plate is 90°.

Preferably, the fixing device is slidingly arranged on the fixing rod along a length direction of the fixing rod.

Preferably, the connection point between the fixing rod and the fixing device is taken as the rotation point, and the fixing device rotates around the fixing rod in a range of 0-90°.

Preferably, a groove is arranged on an opposite side of the two fixing rods; when an angle between the fixing device and the fixing rod is 0°, the fixing device is located in the groove.

Preferably, the fixing clip is a plastic circular fixing clip or a rubber circular fixing clip, and a diameter of the fixing clip is adjustable.

Preferably, an end of the immobilization baseplate is also provided with a display, and the display is located between two fixing rods; the display is electrically connected to the weight sensor and the electrode plate respectively.

Preferably, the 3D microcomputer is provided with four adjustable soft rods, and each adjustable soft rod is provided with the 3D laser scanning lens through the regulated multiplexer. Preferably, the 3D microcomputer is provided with a handle.

In the poultry body size data acquisition system disclosed in this application, the poultry is placed on the electrode plate, and the height of the fixing device on the fixing rod is adjusted so that the fixing clip fixes the knee joints of the two legs of the poultry, and then fixes the body of the poultry, and the stability, comprehensiveness, and accuracy of further 3D scanning is ensured. After the poultry is fixed, the 3D laser scanning lens performs a comprehensive and careful 3D scanning of the entire body of the poultry, and sends the scanning data to the 3D microcomputer. The 3D microcomputer automatically forms the optimal dynamic modeling image. The 3D microcomputer collects and sorts out the data of each site collected in the dynamic modeling image of poultry, and then the data is analyzed by the computer algorithm. Finally, the data of each body size index of poultry is presented on the display of a 3D microcomputer, and the collection of body size data of poultry can be completed. The system provided in this application can avoid the problems of inaccurate measurement data caused by the measurement of electronic scales, tapes, vernier calipers, chest anglers, and other tools in traditional technology. Meanwhile, it also speeds up the composition data collection of the poultry body and improves the accuracy of the measurement accuracy of poultry body size.

1—immobilization baseplate, 2—electrode plate, 3—fixing rod, 4—fixing device, 5—fixing clip, 6—weight sensor, 7—3D microcomputer, 8—adjustable soft rod, 9—regulated multiplexer, 10—3D laser scanning lens, 11—groove, 12—display, 13—handle, 14—bolt, 15—electric telescopic push rod, 16—fixing clip.

DETAILED DESCRIPTION OF THE EMBODIMENTS

The following combines the figures and an embodiment to explain the technical solution.

The poultry body size data acquisition system disclosed in this embodiment of the invention includes a fixing device and a 3D scanning device, wherein the fixing device is used to fix the poultry, and the 3D scanning device is used to scan the body size data of the fixed poultry.

Figure 1:
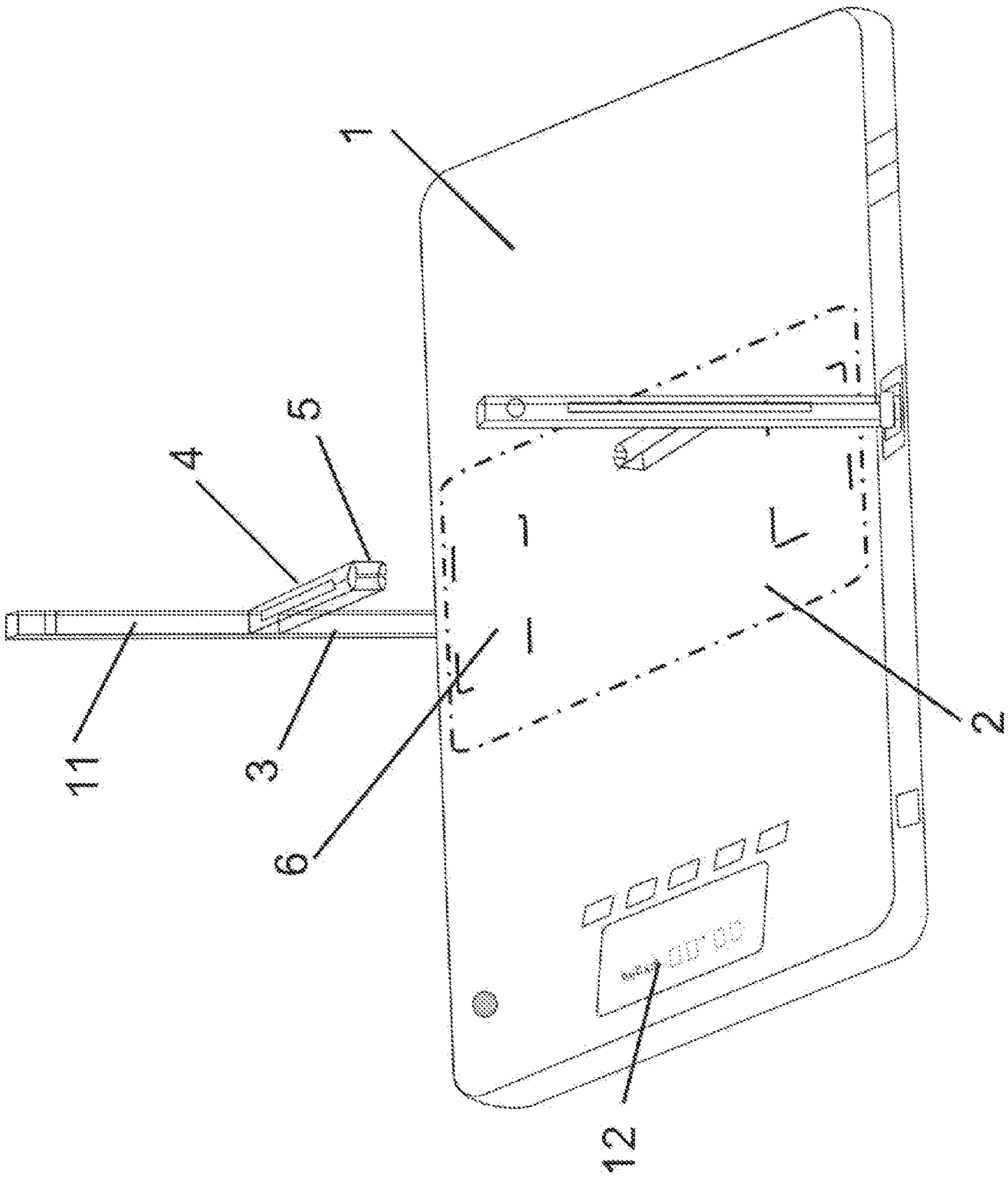
FIG. 1 is a three-dimensional structure diagram of the fixing device disclosed in the embodiment of the invention.
Figure 2:
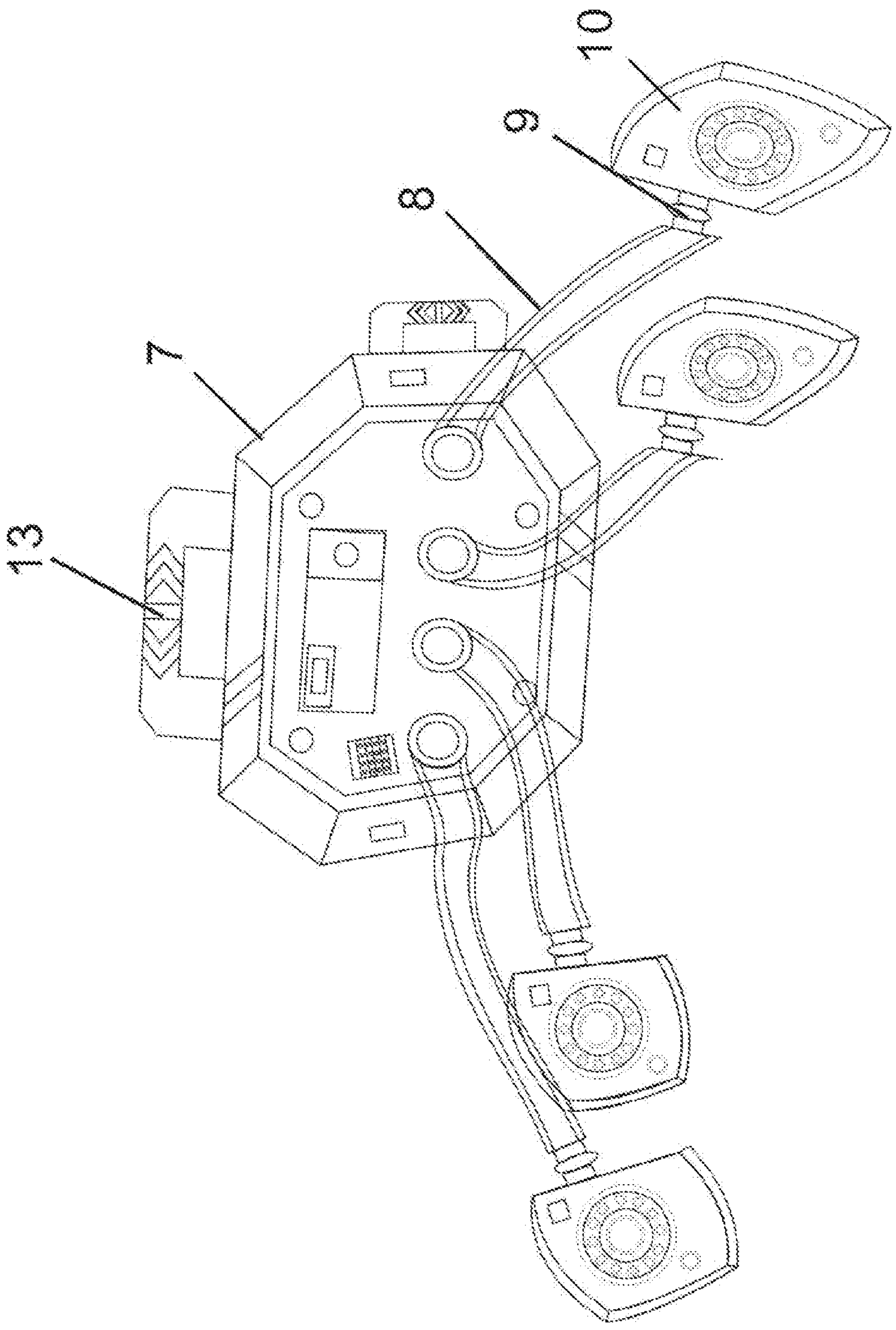
FIG. 2 is a three-dimensional structure diagram of the 3D scanning device disclosed in the embodiment of the invention.

The fixing device provided in this invention includes an immobilization baseplate 1, an electrode plate 2, and two fixing rods 3, as shown in FIG. 1. The two fixing rods 3 are flexibly arranged on the two sides of the immobilization baseplate 1. A fixing device 4 is set on each fixing rod 3, and a fixing clip 5 is set on the end of the fixing device 4. The electrode plate 2 is set on the immobilization baseplate 1, and the electrode plate 2 is located between two fixing rods 3. A weight sensor 6 is arranged inside the immobilization baseplate 1, and the weight sensor 6 is located in the middle of the electrode plate 2.

Figure 3:
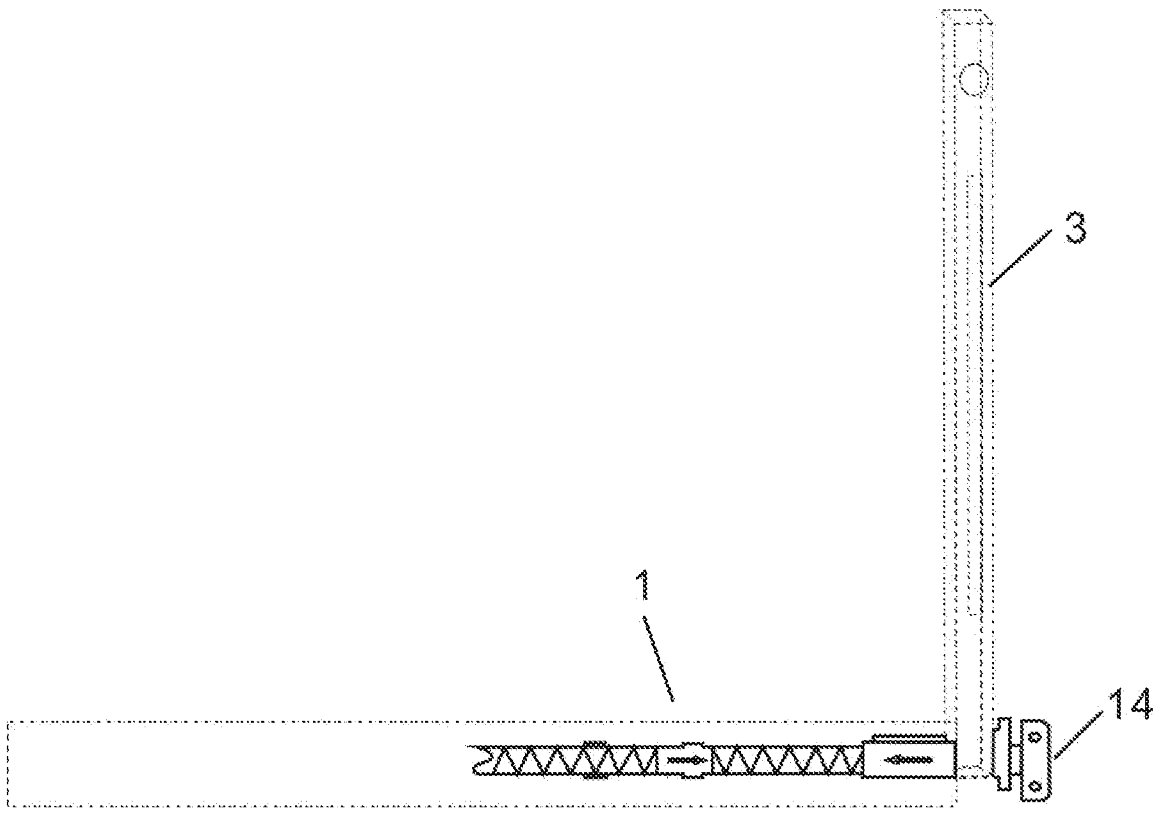
FIG. 3 is a schematic diagram of the connection between the immobilization baseplate and the fixing rod disclosed in the embodiment of the invention.

Specifically, the immobilization baseplate 1 is a component for placing poultry, which is a flat-plate structure. The two sides of the immobilization baseplate 1 are respectively movable with a fixing rod 3. The bottom end of the fixing rod 3 is connected to the side of the immobilization baseplate 1 by bolt 14, as shown in FIG. 3. The connection point between the fixing rod 3 and the immobilization baseplate 1 is taken as the rotation point, the fixing rod 3 can rotate around the immobilization baseplate 1 in the range of 0-180°. That is, when the angle of the fixing rod 3 needs to be adjusted, the bolt 14 is loosened, and then the fixing rod 3 is rotated. When the fixing rod 3 rotates to the target position, the bolt 14 is tightened to realize the rotation of the fixing rod 3 around the immobilization baseplate 1. When the fixing device is not used, the two fixing rods 3 are placed horizontally, that is, the two fixing rods 3 are placed transversely. At this time, the angle between the two fixing rods 3 and the immobilization baseplate 1 is 0° or 180°. When it is necessary to collect the data on poultry body size, the two fixing rods 3 are upright, that is, the two fixing rods 3 are placed perpendicular to the immobilization baseplate 1. At this time, the angle between the two fixing rods 3 and the immobilization baseplate 1 is 90°, that is, the angle between the two fixing rods 3 and the electrode plate 2 is 90°. If the poultry breaks away during the body size data acquisition process, the fixing rods 3 will swing back and forth. At this time, the angle between the two fixing rods 3 and the immobilization baseplate 1 is between 0° and 180°.

Figure 4:
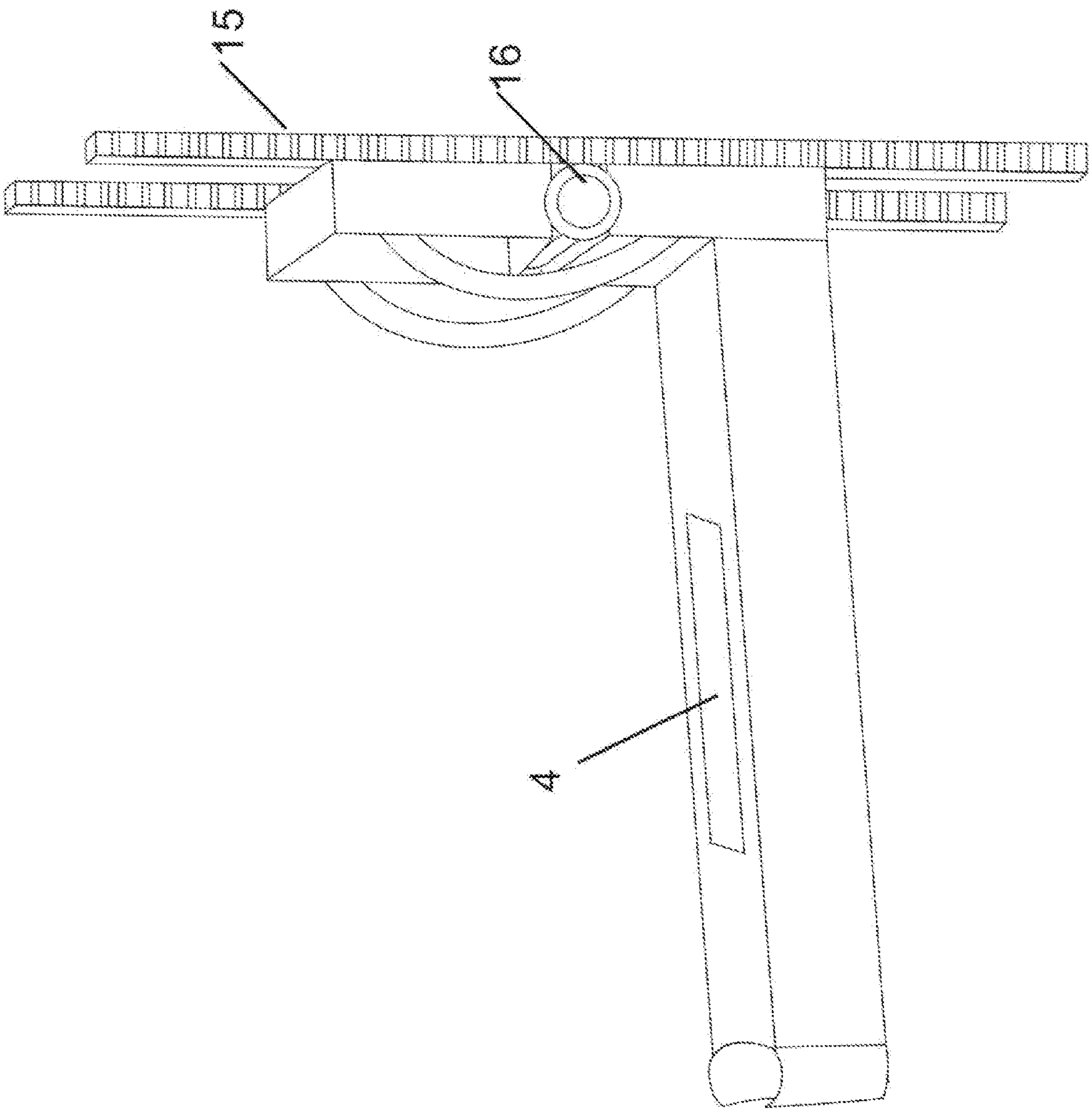
FIG. 4 is a schematic diagram of the connection between the fixing device and the fixing rod disclosed in the embodiment of the invention.

A fixing device 4 is flexibly arranged on each fixing rod 3, the fixing device 4 is used in conjunction with the fixing clip 5 to fix the two legs of poultry, so as to avoid the poultry walking or shaking the lower body during the collection of poultry body size data. Along the length direction of the fixing rod 3, the fixing device 4 can slide up and down on the fixing rod 3. Specifically, the side opposite to the two fixing rods 3 is provided with a groove (not shown in the figures), and the electric telescopic push rod 15 is arranged inside the groove. A fixing clip 16 is set on the electric telescopic push rod 15, and a fixing clip 4 is set on the fixing clip 16, as shown in FIG. 4. Under the expansion of the electric telescopic push rod 15, the fixing clip 16 can move up and down along the fixing rod 3 in the groove, and then drive the fixing device 4 to move up and down along the fixing rod 3, so that the fixing device 4 can be applied to poultry of different individual heights.

Same as the fixing rod 3, the fixing device 4 rotates around the fixing rod 3 in the range of 0-90° according to the connection point of the fixing rod 3 and the fixing device 4. Specifically, the fixing clip 16 is a 90-degree self-locking hinge, and the fixing device 4 is set on a fold of the 90-degree self-locking hinge. When the fixing device is not used, the fixing device 4 is placed parallel to the fixing rod 3, that is, the 90-degree self-locking hinge is in a closed state. At this time, the angle between the fixing device 4 and the fixing rod 3 is 0°. When it is necessary to collect the data on poultry body size, a folding of the 90-degree self-locking hinge is opened, the fixing device 4 is automatically opened, and the fixing device 4 is placed perpendicular to the fixing rod 3. At this time, the angle between the fixing device 4 and the fixing rod 3 is 90°.

Furthermore, when the fixing device 4 is placed parallel to the fixing rod 3, a groove 11 is arranged on the opposite side of the two fixing rods 3 in order to facilitate the storage of the fixing device 4. When the angle between the fixing device 4 and the fixing rod 3 is 0°, the fixing device 4 is accommodated in the groove 11.

The end of the fixing device 4 is equipped with a fixing clip 5, which is used to fix the knee joints of two legs of poultry. The fixing clip 5 is a clamping structure that can be flexibly adjusted, which can adjust the size of the annular diameter in the closed state according to the thickness of the poultry knee joint so that the fixing clip 5 is consistent with the thickness of the poultry knee joint. Specifically, the size of the annular diameter of the fixing clip 5 in the closed state can be adjusted by screw or pulley group to adapt to different shapes of poultry. Preferably, the fixing clip 5 is a plastic circular fixing clip or a rubber circular fixing clip, and the diameter of the fixing clip 5 can be adjusted. When fixing the knee joints of the two legs of the poultry with the fixing clip 5, this setting method has a buffer effect on the knee joints when the poultry breaks away and prevents damage to the poultry.

When collecting the body size data of poultry, the poultry is placed on the immobilization baseplate 1, and then the height of the fixing device 4 is adjusted to make the fixing clip 5 clamp the knee joints of the legs of poultry, so as to weigh the body of the poultry and fix the body, so as to ensure that the poultry is in the middle position of the immobilization baseplate 1.

In the embodiment of this invention, in order to reduce or avoid the stress response such as violent flapping of wings during the data collection of poultry body size, and minimize the data error during the collection process, a transparent ring rubber belt with a thickness of about 0.2 mm is fitted in the center of the poultry wing before fixing the knee joints of the two legs of poultry, so as to ensure the smooth data collection of poultry body size.

In the embodiment of this invention, the electrode plate 2 is set in the central area of the immobilization baseplate 1, which is used to place the two feet of poultry to facilitate the data collection of body size. The weight sensor 6 installed inside the immobilization baseplate 1 is a uniform, parallel, and symmetrical component, which is used to weigh poultry. In addition, the end of the immobilization baseplate 1 is also equipped with a display 12, and the display 12 is located between two fixing rods 3. In order to facilitate the observer to observe and record the data, the display 12 is set at the one side of the immobilization baseplate 1. In the embodiment of this invention, the display 12 is electrically connected to the electrode plate 2 and the weight sensor 6 respectively. When the poultry is placed on the electrode plate 2, the weight sensor 6 weighs the poultry, and the obtained weight data is displayed directly through the display 12.

In the embodiment of this invention, the fixing rod 3 and the fixing device 4 can be moved flexibly and freely, so that the poultry can be placed on the immobilization baseplate 1. The fixing rod 3 and the fixing device 4 are made of stainless steel metal materials and plastic materials.

In addition, the main body of the immobilization baseplate 1 is made of raw steel and high-strength tempered glass, which makes the bottom and side of the immobilization baseplate 1 have superior corrosion resistance, low temperature resistance, and enhanced firmness. The upper surface of the immobilization baseplate 1 is made of high-strength tempered glass, which enables the two fixing rods 3 to be set on the side of the immobilization baseplate 1, the high-strength tempered glass is also protective. The inside of the four-foot seats at the bottom of the immobilization baseplate 1 is made of native steel, which makes the immobilization baseplate 1 have a stronger bearing capacity. The rubber configured externally at the feet can play a buffering role and make the measurement results more accurate.

The 3D scanning device in the embodiment of this invention includes a 3D microcomputer 7 and an adjustable soft rod 8 set on 3D microcomputer 7. The end of the adjustable soft rod 8 is equipped with a 3D laser scanning lens 10 through the regulated multiplexer 9. The 3D microcomputer 7 is the core processing component for scanning poultry bodies and obtaining the body size data. This component integrates AI technology, 3D scanning technology, 3D modeling, 3D point cloud measurement, infrared scanning technology, ranging/ranging depth calculation, and other technologies, as well as electrical connection technologies such as microprocessors, analog-to-digital converters, and digital-to-analog converters, so as to obtain poultry body size data in an all-round way.

The adjusting lever 8 in the embodiment of the invention is set behind the 3D microcomputer 7. The adjustable soft rod 8 made of silicone rubber plastic hose enables the 3D laser scanning lens 10 to be freely and flexibly adjusted according to the weight and position of poultry during the 3D scanning process. Preferably, four adjustable soft rods 8 are set on the 3D microcomputer 7, and each adjustable soft rod 8 is equipped with a 3D laser scanning lens 10 through the regulated multiplexer 9. The 3D laser scanning lens 10 is used to scan the poultry fixed on the immobilization baseplate 1, so that the body size data of poultry can be obtained by scanning. In addition, the 3D microcomputer 7 is equipped with a handle 13, which can be set at the top of the 3D microcomputer 7 or at the side of the 3D microcomputer 7, as long as it is easy to grasp.

The poultry body size data acquisition system provided in the embodiment of the invention is used to place the poultry on the electrode plate 2, adjust the height of the fixing device 4 on the fixing rod 3, so that the fixing clip 5 fixes the knee joints of the poultry's two legs, and then fixes the poultry's body, and further the 3D scanning is stable, comprehensive and accurate. After the poultry is fixed, the 3D laser scanning lens 10 performs a comprehensive and careful 3D scanning of the entire body of poultry, and sends the scanning data to the 3D microcomputer 7. The 3D microcomputer 7 automatically forms the optimal dynamic modeling image. The 3D microcomputer 7 collects and sorts out the data of various sites collected in the dynamic modeling image of poultry, and then the data is analyzed by the computer algorithm. Finally, the data of various body size indexes of poultry are presented on the display of 3D microcomputer 7, and the data collection of the body size of poultry can be completed. The system provided in the embodiment of the invention can avoid the problems of inaccurate measurement data caused by the measurement of electronic scales, tapes, vernier calipers, chest anglers, and other tools in traditional technology, meanwhile, it also speeds up the collection of poultry body composition data and improves the data measurement accuracy of poultry body size.

It should be noted that in this invention, relational terms such as 'first' and 'second' are used only to distinguish an entity or operation from another entity or operation, without necessarily requiring or implying that there is any such actual relationship or order between those entities or operations. Moreover, the term 'include', 'comprise', or any other variant thereof, is intended to cover non-exclusive inclusion, a process, method, article, or device that includes a set of elements includes not only those elements but also other elements that are not explicitly listed or that are inherent to the process, method, article, or device. In the absence of more restrictions, by the statement 'including a . . . ', the limited elements do not exclude that there are other elements in the process, method, goods, or equipment including the elements.

What is claimed is:

1. A poultry body size data acquisition system, comprising: a fixing device and a 3D scanning device, wherein the fixing device comprises an immobilization baseplate, an electrode plate, and fixing rods flexibly arranged on relative sides of the immobilization baseplate, and the electrode plate is located between two fixing rods, the fixing device is flexibly arranged on each fixing rod, and a fixing clip is arranged at an end of the fixing device; a weight sensor is arranged inside the immobilization baseplate, and the weight sensor is located in a middle of the electrode plate; the 3D scanning device comprises a 3D microcomputer and an adjustable soft rod set on the 3D microcomputer; the adjustable soft rod is equipped with a 3D laser scanning lens through a regulated multiplexer; the 3D laser scanning lens scans poultry fixed on the immobilization baseplate.

2. The poultry body size data acquisition system according to claim 1, wherein a connection point between a fixing rod and the immobilization baseplate is taken as a rotation point, and the fixing rod rotates around the immobilization baseplate in a range of 0-180°.

3. The poultry body size data acquisition system according to claim 1, wherein when a fixing rod is upright, an angle between the fixing rod and the electrode plate is 90°.

4. The poultry body size data acquisition system according to claim 1, wherein the fixing device is slidingly arranged on a fixing rod along a length direction of the fixing rod.

5. The poultry body size data acquisition system according to claim 4, wherein a connection point between the fixing rod and the fixing device is taken as a rotation point, and the fixing device rotates around the fixing rod in a range of 0-90°.

6. The poultry body size data acquisition system according to claim 1, wherein the fixing clip is a plastic circular fixing clip or a rubber circular fixing clip, and a diameter of the fixing clip is adjustable.

7. The poultry body size data acquisition system according to claim 1, wherein an end of the immobilization baseplate is also provided with a display, and the display is located between two fixing rods; the display is electrically connected to the weight sensor and the electrode plate respectively.

8. The poultry body size data acquisition system according to claim 1, wherein the 3D microcomputer is provided with four adjustable soft rods, and each adjustable soft rod is provided with the 3D laser scanning lens through the regulated multiplexer.

9. The poultry body size data acquisition system according to claim 1, wherein the 3D microcomputer is provided with a handle.

* * * * *